Figure 1:
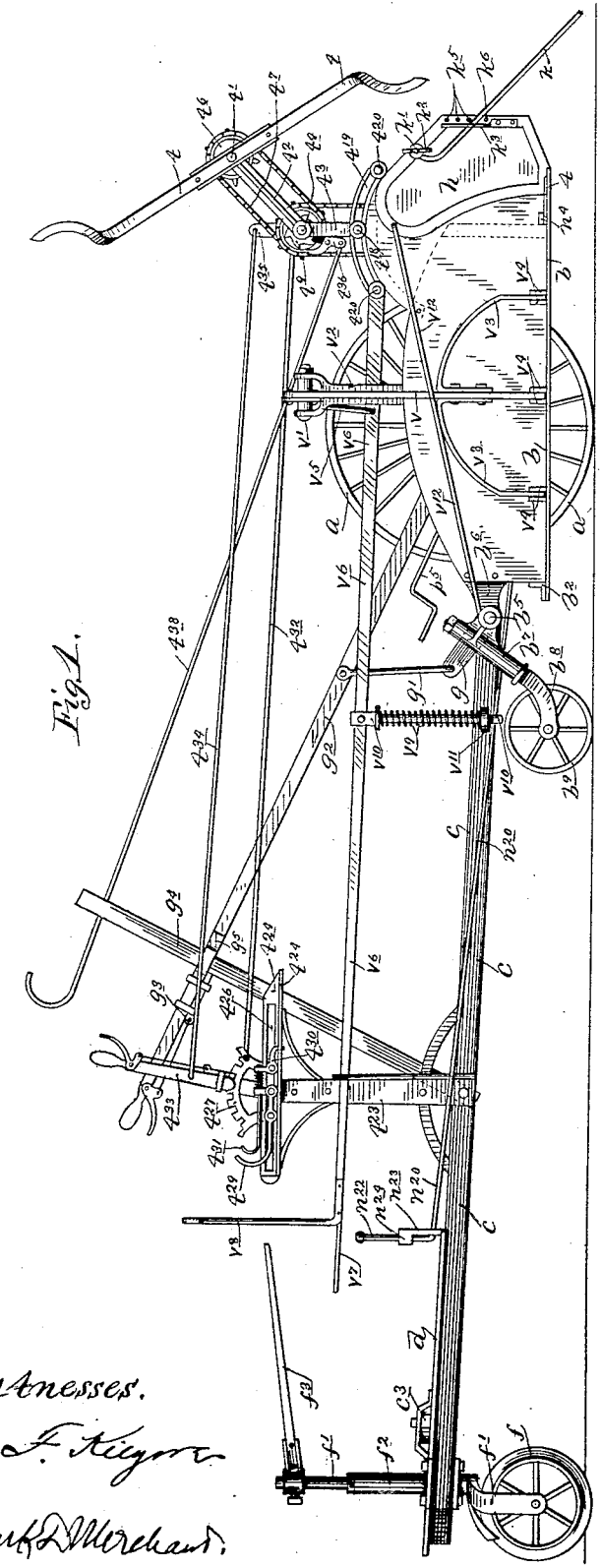

(No Model.) 5 Sheets—Sheet 2.
R. PEDERSON.
CORN HARVESTER.
No. 553,421. Patented Jan. 21, 1896.
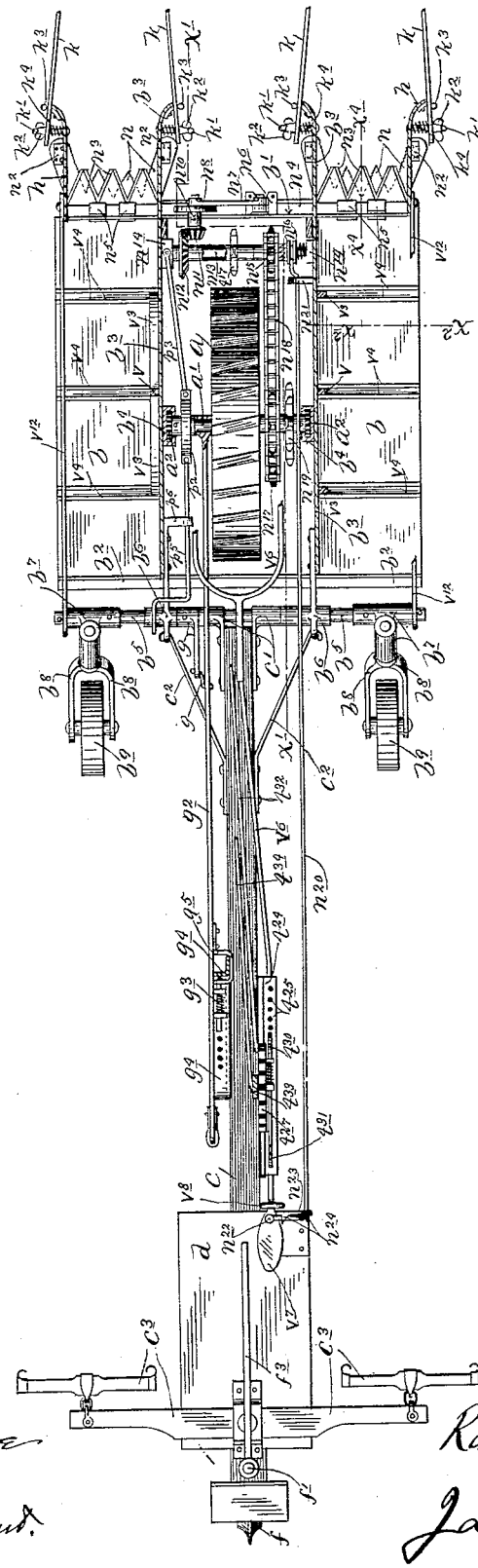
Fig. 2.
Witnesses.
C. L. Kilgore
Frank P. Merchant
Inventor.
Rasmus Pederson
By his Attorney.
Jas. F. Williamson

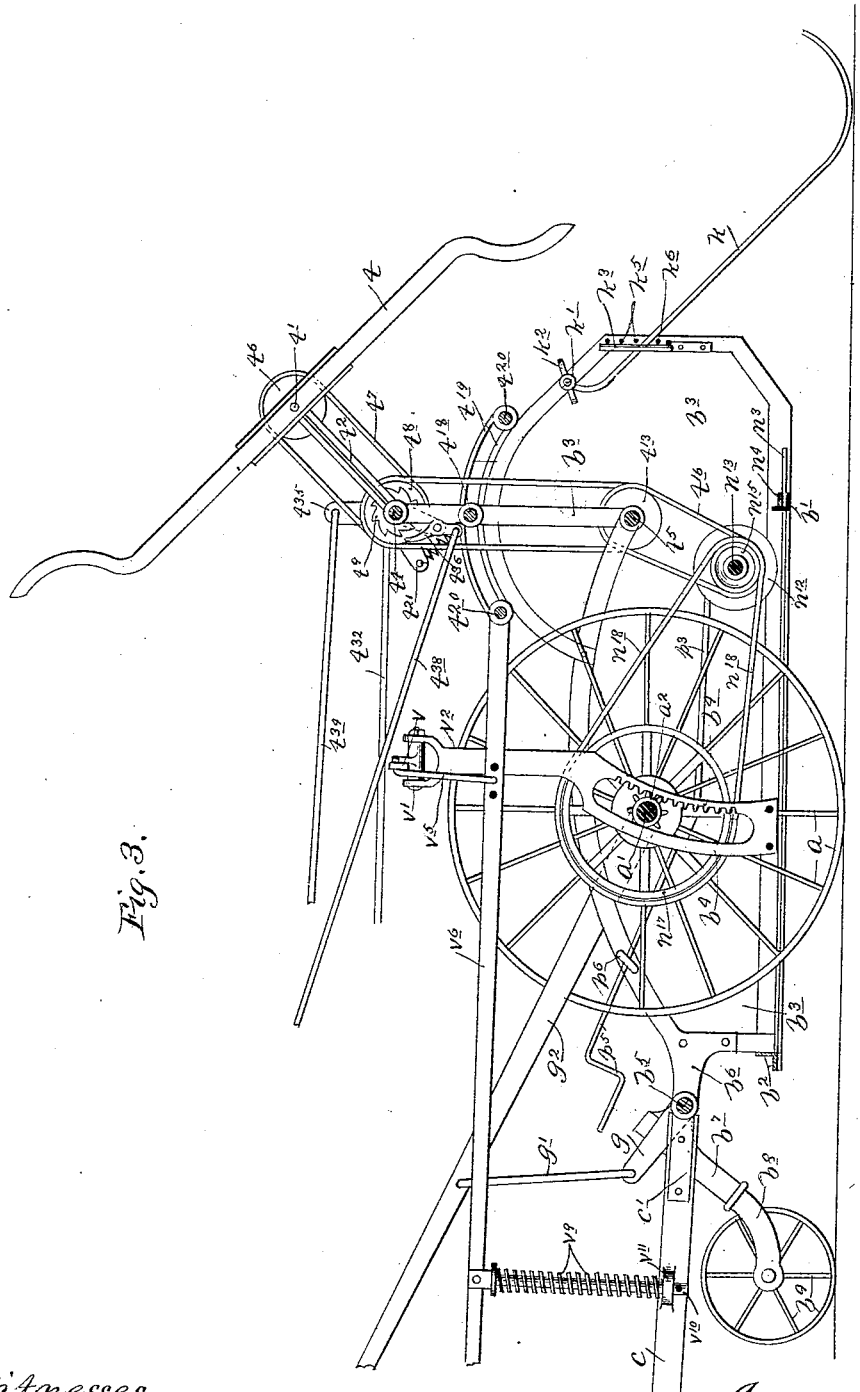

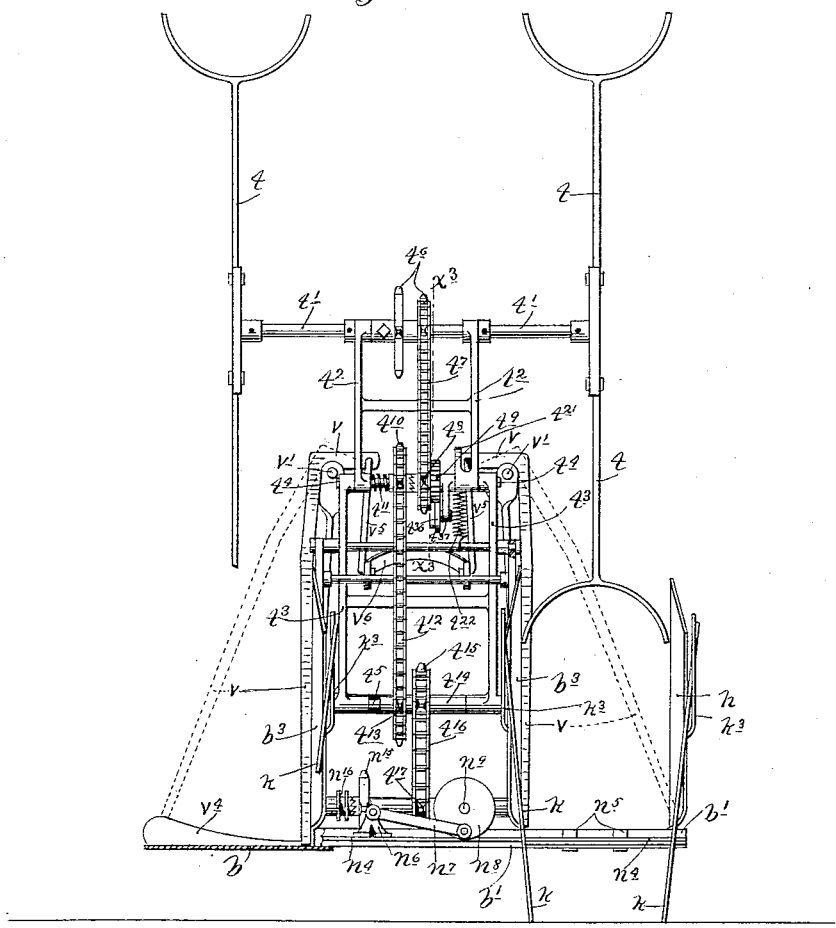

(No Model.) 5 Sheets—Sheet 5.
R. PEDERSON.
CORN HARVESTER.
No. 553,421. Patented Jan. 21, 1896.
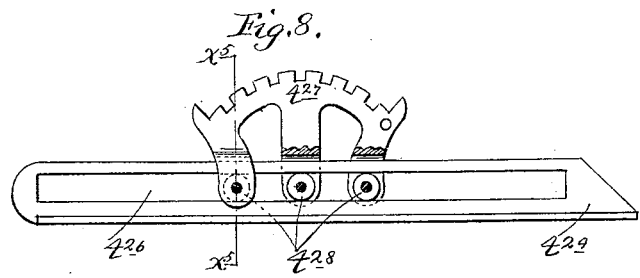
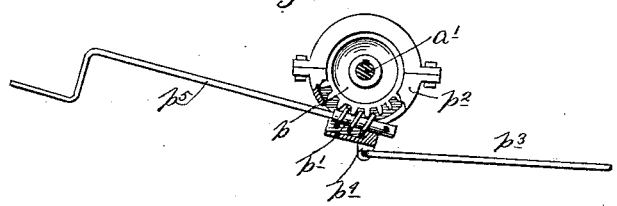
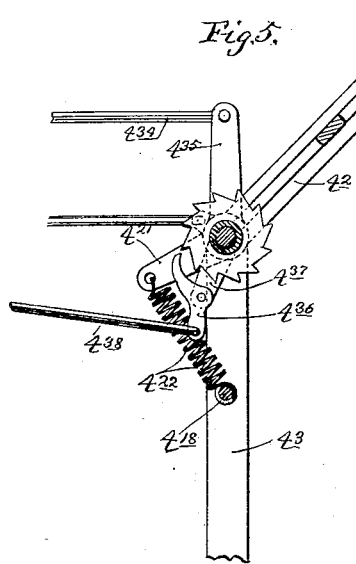
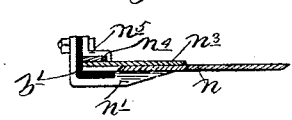
Witnesses.
C. F. Kilgore
Frank D. Merchant
Inventor.
Rasmus Pederson
By his Attorney.
Jas. F. Williamson

UNITED STATES PATENT OFFICE.

RASMUS PEDERSON, OF DRAMMEN, MINNESOTA.

CORN-HARVESTER.

SPECIFICATION forming part of Letters Patent No. 553,421, dated January 21, 1896.

Application filed March 22, 1895. Serial No. 542,762. (No model.)

*To all whom it may concern:*

Be it known that I, RASMUS PEDERSON, a citizen of the United States, residing at Drammen township, in the county of Lincoln and State of Minnesota, have invented certain new and useful Improvements in Corn-Harvesters; and I do hereby declare the following to be a full, clear, and exact description of the invention, such as will enable others skilled in the art to which it appertains to make and use the same.

My invention relates to corn-harvesters.

In certain of its features the machine herein shown and described is similar to the machine described in my former United States patents, to wit: No. 494,023, of date March 21, 1893; No. 522,385, of date July 3, 1894, and No. 522,386, of date July 3, 1894. In my present invention, however, the general arrangement of the machine is entirely different from that shown in my said prior patents and several important features of improvement have been added.

As a brief forecast of the detailed description that is to follow it may be observed that the machine is designed to be drawn, or rather pushed ahead of the horses, after the manner of that class of grain-machines generally known as "headers." The main body of the machine is carried almost entirely by a single drive-wheel, which is located between the bundle-tables and near the center of gravity of the table-section of the machine. The machine is steadied from sidewise-tilting motion by a pair of steadying or balancing wheels, located one on each side of the longitudinal center of gravity of the machine. The driver stands on a platform carried at the rear end of a rearwardly-extending steering-pole, which end is supported by a rudder-wheel, by means of which the machine is guided. The bundle-tables, instead of being pivoted, as is usual, are rigid, and I employ pivoted discharge-arms working over the same to discharge the bundles. The levers and other connections for operating the reels, the discharge-arms for tilting the machine and for throwing the driving-gear in and out of action, as well as the lever connection from the rudder-wheel, all extend to within an easy reach of the operator standing on the driver's platform.

Other novel details of construction will appear in the following detailed description, and be illustrated in the accompanying drawings.

In the drawings, like letters referring to like parts throughout the several views, Figure 1 is a right side elevation of the machine. Fig. 2 is a plan view of the same, some parts being shown in section, some broken away, and others removed. Fig. 3 is a vertical section of the machine, taken on the line $X'$ $X'$ of Fig. 2, looking from the right, some parts being broken away. Fig. 4 is a view principally in front elevation and partially in vertical section taken on the line $X^2$ $X^2$ of Fig. 2, the wheels of the machine as well as certain other rear portions not being shown. Fig. 5 is a detail of a portion of the support for the reel, taken on the line $X^3$ $X^3$ of Fig. 4, looking from the right side of the machine. Fig. 6 is a vertical section through one of the cutters, taken on the line $X^4$ $X^4$ of Fig. 2. Fig. 7 is a detail view in right side elevation, some parts being broken away, showing a worm and worm-gear together with a case for the same, which parts are used for raising and lowering the machine. Fig. 8 is a detail view in right side elevation, some parts being broken away, showing a sliding latch-segment and runway for the same, constituting a portion of the reel-controlling mechanism; and Fig. 9 is a transverse vertical section taken on the line $X^5$ $X^5$ of Fig. 8.

$a$ represents the drive-wheel, which is loosely mounted on a shaft $a'$, to the outer ends of which shaft are rigidly secured the pinions $a^2$.

$b\ b$ represent the bundle-tables located on opposite sides of said drive-wheel and secured together, respectively, at their front and rear ends, by angle-bars $b'\ b^2$. Rising from the inner edge of these bundle-tables $b$, rigidly secured therewith, running longitudinally thereof, and terminating forward of the angle-bar $b'$, are a pair of side plates $b^3$. Secured to the inner side of these side plates are a pair of channel-like segments $b^4$, in which the pinions $a^2$ of the shaft $a'$ work, and by means of which connections the drive-wheel $a$ is mounted to carry the bundle-table section of the machine. $b^5$ is a transverse shaft loosely mounted in bearings $b^6$, projecting rearward from the walls $b^3$ and the angle-bar $b^2$. At the outer ends of this shaft are rigidly secured the caster-bearings $b^7$, in which bearings $b^7$ are pivotally mounted brackets $b^8$ of caster-wheels $b^9$. These caster-wheels $b^9$ constitute the balancing-wheels of the machine, and in virtue of the fact that they are in the form of caster-wheels will, of course, follow the course of the machine.

$c$ is the steering-pole, pivotally mounted at its forward end by means of brackets $c'$ on the cross-shaft $b^5$ and braced against sidewise motion by brace-rods $c^2$, secured to said pole $c$ and hooked at their forward ends into seats in the brackets $b^8$.

$d$ represents the driver's or operator's platform, which is secured to the rear end of the steering-pole $c$.

$f$ is the rudder-wheel, mounted in the caster-bracket $f'$, the stem of which caster-bracket is pivotally mounted in the vertical bearing $f^2$, secured to the rear end of said steering-pole, and is provided at its upper end with an operating-lever $f^3$, projecting over the platform $d$. It will be here noted that the face of this steering-wheel $f$ is wedge-shaped. This permits the wheel when running to cut a groove-track, which prevents the wheel from slipping sidewise in the action of steering the machine.

$c^3$ represents a doubletree, pivoted to the rear end of the platform $d$ and pole $c$. As is obvious, the horses are attached to this doubletree, standing one on each side of the pole $c$ and to rear of the caster-wheels $b^9$.

Rigidly secured on the shaft $b^5$, near the center of the same, is an arm $g$, connected by means of a link $g'$ to the intermediate portion of a long lever $g^2$. This lever $g^2$ is pivoted at its forward end on the drive-wheel shaft $a'$, and is held at its rearward or free end in whatever position it may be set by means of a hand-operated spring-latch $g^3$, carried by said lever and co-operating with a perforated latch-bar $g^4$. As shown, this latch-bar $g^4$ is in the form of an angle-bar, and is pivoted at its lower end to the pole $c$ to permit the necessary pivotal motion under the adjustment of the lever $g^2$. This bar $g^4$ is held in its proper working position in respect to the spring-latch $g^3$ by means of a keeper $g^5$, carried by said lever $g^2$. As is evident, by moving this lever $g^2$ the inclination of the caster-wheel bearings $b^7$ may be varied so as to raise or lower the shaft $b^5$, thus rocking the bundle-table section of the machine on the shaft $a'$ as a fulcrum, to change the inclination of the bundle-table.

$h$ $h$ represent a pair of vertical plates secured to and rising from the angle-bar $b'$ forward of the bundle-tables. The forward ends of these plates $h$ and the forward ends of the plates $b^3$ are curved or flared from each other, so as to form a pair of gathering-crotches, one in line of each of the bundle-tables.

$k$ represents the arighting or gathering arms, which are four in number and are pivotally mounted one from the outer side of each of the gathering-plates $h$ and one from the inner side of the forward ends of the plates $b^3$. This pivotal connection is made by means of studs $k'$ projecting from said plates $h$ and $b^3$, working through perforations in the rear ends of said arms $k$, and having at their outer ends thumb-nuts $k^2$. The gathering-arms $k$ are guided laterally between the outer or forward edges of the plates $h$ or $b^3$, as the case may be, and vertically-projecting fingers $k^3$, carried by said plates. The forward or gathering ends of these arighting-arms $k$ are turned upward to prevent the same from being stuck into the ground under the forward movement of the machine, and are permitted a slight yielding lateral motion under the action of the coiled springs $k^4$ and the studs $k'$. The plates $h$ and $b^3$ are also provided at their forward edges with a series of perforations $k^5$, in which may be inserted pins $k^6$ to hold the arighting-arms $k$ at any desired distance above the ground, or, if desired, by removing these pins $k^6$ the arms $k$ will be allowed to rest upon the ground. When out of use, these arms $k$ may be thrown upward and backward on the machine out of the way. It must be evident that with this construction the arighting-arms may be adjusted to the various positions of the bundle-tables, and that the arms may yield against the springs $k^4$ under excessive strains, thus preventing breaking or bending of the same.

The cutting devices which I employ in this machine are of novel design, and comprise each a pair of serrated knives, one of which is fixed and the other of which is movable. The fixed section $n$ is secured partly to the bar $b'$ by means of a bracket $n'$ and partly to the plates $h$ and $b^3$ by means of brackets $n^2$. The extreme side portions of these fixed knife-sections co-operate with the forward ends of the said plates $h$ and $b^3$, to form the gathering-crotches of the cutters.

$n^3$ represents the movable cutters or knives, both of which are secured to a common bar $n^4$ and work over their respective co-operating fixed cutters $n$. The said bar $n^4$ is held in working position and permitted a lateral reciprocating motion with the knives $n^3$ by means of keepers $n^5$ fixed to the angle-bar $b'$. It should be here noted that the cutting portions of these knives $n$ and $n^3$ project forward beyond both the keepers and rear supports for the same. This is important, as the cornstalks will never be caught by any other projections than the knives themselves after they are once within the gathering-crotches.

Reciprocating motion is imparted to the knives $n^3$ and bar $n^4$ through the following driving connections, to wit:

$n^6$ is a bracket fixed to the bar $n^4$, connected by a pitman $n^7$ with a crank-disk $n^8$ on a short shaft $n^9$, mounted in a bearing $n^{10}$, secured to the angle-bar $b'$. Shaft $n^9$ has on its rear end a bevel-pinion $n^{11}$ in engagement with a bevel-wheel $n^{12}$, rigidly secured on a short shaft $n^{13}$, mounted in bearings $n^{14}$ secured to the under side of the bundle-tables $b$.

$n^{15}$ is a sprocket-wheel, which is loosely mounted on the shaft $n^{13}$ and is provided with a half-clutch, which is engageable with a spring-held sliding half-clutch $n^{16}$, mounted for sliding motion on shaft $n^{13}$, by means of an ordinary key or feather. (Not shown.) The sprocket-wheel $n^{15}$ receives motion from a large sprocket-wheel $n^{17}$, carried by the drive-wheel $a$, through a sprocket-chain $n^{18}$ passing over both of said sprocket-wheels $n^{15}$ and $n^{17}$.

$n^{19}$ is an idle sprocket-wheel carried with said drive-wheel $a$ and sprocket-wheel $n^{17}$. In the present arrangement of the machine this sprocket $n^{19}$ has no special use, but is simply shown to illustrate how, in case binders were added, driving connections for the same might be readily attached to receive motion from the drive-wheel.

The sliding half-clutch $n^{16}$ is shifted to render operative or inoperative the driving mechanism on the cutters by a long rocking crank-rod $n^{20}$, mounted at its forward end in a bearing-lug $n^{21}$ projecting from the right side plate $b^3$ and having at its rear end a handle-piece $n^{22}$, which co-operates with a lock-plate $n^{23}$, fixed to the driver's platform, which lock-plate has catch-lugs $n^{24}$, which serve to hold the handle-piece $n^{22}$, and hence the sliding half-clutch $n^{16}$, in whichever of their extreme positions they may be set.

The machine is raised and lowered by means of a screw-wheel $p$, fixed on the drive-wheel shaft $a'$ and subject to the action of a worm $p'$. The wheel $p$ is incased in a nest $p^2$, which forms also a seat for the worm $p'$. This nest $p^2$ is held from rotary motion by a rod $p^3$, connected at one end to a projecting lug $p^4$ of the same and at its other end to the left member of the bearings $n^{14}$, thus forming a base of resistance for the worm $p'$. This worm $p'$ receives motion from a crank-rod $p^5$, which is held in position near its rearward end by a bracket $p^6$ projecting from the left side plate $p^3$.

As is evident, by turning the crank-rod $p^5$ and worm $p'$, the wheel $p$, the shaft $a'$, and the pinions $a^2$ in engagement with the segments $b^4$ will all be revolved, which action will, of course, raise or lower said segments $b^4$, carrying therewith the bundle-table section of the machine.

$t\ t$ represent the reel-blades, which work one over each of the cutting devices and serve to deliver the cut stalks onto the bundle-tables $b$. These reel-blades $t$ are carried by a cross-shaft $t'$, mounted in the free end of a pivoted reel-bracket $t^2$, which bracket $t^2$ is pivoted at its other end to the upper end of the main reel bracket or support $t^3$ by means of a cross-shaft $t^4$. This main reel-bracket $t^3$ is pivotally mounted at its lower end to the side plates $b^3$ by means of a cross-shaft $t^5$. The reel-blades are given their rotary motion on the shaft $t'$ as follows:

$t^6$ represents an integrally-formed pair of interchangeable sprocket-wheels, one or the other of which (according to which one is used) is connected by a chain $t^7$ with a loose sprocket-wheel $t^8$ on the shaft $t^4$. This sprocket-wheel $t^8$ carries on one face a ratchet-wheel $t^9$ (the purpose of which will later appear) and on its other face a half-clutch, which is engageable with another half-clutch carried by a sprocket-wheel $t^{10}$ also loose on the shaft $t^4$. The half-clutches of the sprockets $t^8$ and $t^{10}$ are so constructed that motion being imparted to the sprocket $t^{10}$ it will drive the member $t^8$ under the advance movement of the machine, and the said clutches are normally held in engagement by a coil-spring $t^{11}$ on shaft $t^4$ between the bracket $t^2$ and the wheel $t^{10}$. The sprocket $t^{10}$ receives motion through a chain $t^{12}$ passing over the same and also over a sprocket $t^{13}$, carried by a loose sleeve $t^{14}$ on the shaft $t^5$.

$t^{15}$ is a sprocket-wheel carried also by the loose sleeve $t^{14}$ and receiving motion through a driving-chain $t^{16}$ passing over the same and also over a sprocket-wheel $t^{17}$ fixed for motion with the shaft $n^{13}$ and wheel $n^{12}$.

It must be evident from the foregoing that under the advance movement of the machine the reel-blades will receive their proper rotary motion for action on the stalks. The special construction of these reel-blades has been fully set forth and claimed in my prior patents herein referred to.

The pivoted reel-support $t^3$ is provided with a cross-rod $t^{18}$, which works at its opposite ends in a pair of slotted segments $t^{19}$, secured one to the upper edge of each of the side plates $b^3$ and serves to steady and limit the movement of the reel-support. These segments $t^{19}$ are tied together at their opposite ends by brace-rods $t^{20}$, which serve also to support and brace the side plates $b^3$. The laterally-projecting reel-bracket $t^2$ is provided with a rearwardly-projecting arm $t^{21}$, which is connected by means of a coil-spring $t^{22}$ with the cross-rod $t^{18}$, carried by the vertical reel-bracket $t^3$. This spring $t^{22}$ is of sufficient tension to approximately counterpoise the weight of the reel-bracket $t^2$ and the reel-blades carried thereby. The adjustments of these reel-brackets $t^2$ and $t^3$ to throw the reel-blades into their proper operative positions on the stalks is accomplished as follows: $t^{23}$ is a vertical standard secured to and rising from the pole $c$ immediately in front of the driver's platform $d$. To the top of this standard $t^{23}$ is secured an angular head $t^{24}$, the horizontal flange of which is provided with a series of perforations $t^{25}$ and the vertical flange of which is provided with a longitudinal slot or runway $t^{26}$. $t^{27}$ is a sliding latch-segment which straddles the vertical flange of the head $t^{24}$ and is provided with antifriction-rollers $t^{28}$ working in the slotted runway $t^{26}$. This latch-segment $t^{27}$ is provided with a fixed finger-piece $t^{29}$, a spring-held lock-pawl $t^{30}$ engageable with the perforations $t^{25}$ in the head $t^{24}$, and also a movable finger-piece $t^{31}$ for operating said pawl $t^{30}$. This segment $t^{27}$ is connected by means of a rod $t^{32}$ with the upper end of the vertical reel-section $t^3$. $t^{33}$ is a latch-lever pivotally mounted on and co-operating with the latch-segment $t^{27}$. This latch-lever $t^{33}$ is connected by means of a rod $t^{34}$ with a projecting arm $t^{35}$ formed rigid with the reel bracket or support $t^2$.

As is evident, by moving the latch-segment $t^{27}$ forward and backward the latch-lever $t^{33}$ will be carried therewith, and both of the reel-brackets $t^2$ and $t^3$, without changing their angularity with respect to each other, will be moved forward and backward with the said latch-segment and lever; but by allowing the latch-segment to remain stationary and moving the lever $t^{33}$ on the same the reel-bracket $t^2$ will be moved to raise or lower the reel-blades $t$ without affecting the movement of the reel-bracket $t^3$. From the above, as is evident, any desired adjustment of the reel may be readily accomplished.

In a similar manner to that shown in my prior patents, I employ a device by means of which the timing of the reel-blades may, while the machine is running, be readily corrected. This device comprises, in addition to certain parts already mentioned, a pawl $t^{36}$, carried at the free end of an arm $t^{37}$, loosely mounted on the shaft $t^4$ and engageable with the ratchet $t^9$ of the sprocket $t^8$. Normally this pawl $t^{36}$ is out of engagement with the ratchet $t^9$, and is thrown into engagement in the arighting action by means of a hand-rod $t^{38}$, attached at one end to said pawl, extending rearward within reach of the driver's platform and working loosely through the upper end of the latch-bar $g^4$. Obviously by a quick drawing motion on this rod $t^{38}$ the sprocket-wheel $t^8$ may be slipped ahead of the sprocket-wheel $t^{10}$, to bring the reel-blades into proper time for action on the standing stalks, if the same at any time should get out of proper time.

It has now been observed that the stalks after having been cut are delivered by the reels onto the fixed bundle-tables $b$. After the bundles have accumulated to the proper size they are discharged by the simultaneous action of a pair of discharge-arms, which work one over each of said bundle-tables $b$. As shown, these discharge-arms $v$ are pivoted at $v'$ to brackets $v^2$, rising from the segments $b^4$, and secured to the side plates $b^3$. The lower free ends of these discharge-arms are provided with laterally-projecting prongs $v^3$, and the extremities of these prongs, as well as the extremities of the discharge-arms proper, $v$, work between flanges $v^4$, secured on the face of the bundle-tables $b$. It will be noted that these flanges $v^4$ are curved upward toward their outer ends, which serves to prevent the stalks from rolling off from the bundle-tables while accumulating into bundles. The discharge-arms $v$ are provided with angular projections which extend inward and are connected by means of links $v^5$ with the opposite prongs of a long forked lever $v^6$.

This lever $v^6$ is pivoted at its forward end on the cross-tie rod $t^{20}$ and extends rearward to the driver's platform $d$, where it terminates in a foot-piece $v^7$ and handpiece $v^8$. Normally this lever $v^6$ is held in its uppermost position and the discharge-arms $v^3$ in their innermost position against the side plates $b^3$ by means of a coil-spring $v^9$ on a rod $v^{10}$, which rod is pivoted at its upper end to said lever $v^6$, and works at its lower end through a lug $v^{11}$, projecting from the tongue or pole-piece $c$.

$v^{12}$ represents tie-rods which extend from the upper portions of the gathering-plates $h$ to the outer ends of the cross-shaft $b^5$ and serve as braces for said plates.

By placing the foot on the foot-piece $v^7$ or the hand on the handpiece $v^8$, or both, and pressing down on the rear end of the lever $v^6$, the discharge-arms $v$ $v^3$ will be thrown outward into the positions shown by dotted lines in Fig. 4. This action will, of course, discharge both bundles simultaneously from the opposite sides of the machine. The advantages of these discharge-arms and fixed bundle-tables over the ordinary pivoted bundle-tables are thought to be clear. In the first place, the discharge of the bundles is rendered positive, and in the second place, the bundle-tables may be run closer to the ground without being caught or interfered with by the unevenness of the ground.

The general operation and advantages of this machine as an entirety must be clear from the foregoing description.

It will be understood, of course, that various alterations in the details of construction and arrangement of the parts of the machine may be made without departing from the spirit of my invention.

What I claim, and desire to secure by Letters Patent of the United States, is as follows:

1. In a corn harvester, the combination with the pair of bundle tables and corresponding cutters, of a single drive wheel located between said bundle tables, forming a pivot for the bundle table section of the machine, a pair of caster wheels, the seats of which are secured to a common transverse shaft, mounted in bearings to the rear of said drive wheel, a rearwardly extending steering-pole, pivoted at its forward end on said cross shaft, and a rudder-wheel, pivoted to the rear end of said pole, provided with a steering lever, substantially as described.

2. In a corn harvester, the combination with a pair of bundle tables and corresponding cutters, of a single drive wheel located between the bundle tables, forming a longitudinal pivot for the same, a pair of caster wheels, the seats of which are secured to a common transverse shaft, seated at the rear of said drive wheel, a rearwardly extending steering-pole, pivoted, at its forward end, on said cross shaft, a rudder-wheel, pivotally mounted at the rear end of said pole, and lever connections for rocking said bundle tables on the shaft of said drive wheel, as a pivot, substantially as described.

3. In a corn harvester, the combination with a pair of bundle tables, and corresponding cutters, of a single drive wheel located between said tables, the pair of caster wheels secured on a common cross shaft rearward of said drive wheel, the rearwardly extending steering-pole pivoted at its forward end on said cross shaft, the rudder-wheel pivotally mounted at the rear end of said pole, the operator's platform secured to the rear end of said pole, and lever connections for rocking the bundle table section of the machine extending rearward to within reach from the operator's platform, substantially as described.

4. In a corn harvester, the combination with a reel, the support of which comprises two brackets pivoted, one to the machine, and one to the free end of the other, of a sliding carriage, a pivoted lever carried by said carriage, and independent connections respectively between said carriage and said lever and said pivoted reel-brackets, substantially as described.

5. In a corn harvester, the combination with the reel support comprising the bracket $t^3$, pivoted to the machine, and the bracket $t^2$ pivoted to the bracket $t^3$ and provided with the projecting arm $t^{35}$, of the head-piece $t^{24}$, with perforations $t^{25}$, and runway $t^{26}$, the latch-segment $t^{27}$ having rollers $t^{28}$, working in said runway $t^{26}$, and provided with the lock-pawl $t^{30}$, engageable with said perforations $t^{25}$, the pivoted latch-lever $t^{33}$ carried by and co-operating with said latch segment $t^{27}$, the connecting rod $t^{34}$ between said lever $t^{30}$ and arm $t^{35}$, and the connection $t^{32}$ between said segment $t^{27}$, and the reel-bracket $t^3$, substantially as described.

6. In a corn harvester, the combination with the gathering crotch, formed by the forward extremities of the plates $h$ and $b^3$, of the arighting arms $k$ pivoted to said plates on the studs $k'$ and subject to the lateral yielding action of the springs $k^4$, the vertical fingers $k^3$ and the pins $k^6$ insertible into the perforations $k^5$, substantially as and for the purpose set forth.

In testimony whereof I affix my signature in presence of two witnesses.

RASMUS PEDERSON.

Witnesses:
    A. L. SLOSS,
    EDWIN E. POWDERLY.